(12) United States Patent
Simnacher

(10) Patent No.: US 8,035,245 B1
(45) Date of Patent: Oct. 11, 2011

(54) WINDPOWER GENERATOR APPARATUS WITH AUXILIARY GENERATORS

(76) Inventor: Larry W. Simnacher, Bay City, TX (US)

( * ) Notice: Subject to any disclaimer, the term of this patent is extended or adjusted under 35 U.S.C. 154(b) by 596 days.

(21) Appl. No.: 12/238,305

(22) Filed: Sep. 25, 2008

Related U.S. Application Data

(63) Continuation-in-part of application No. 11/617,581, filed on Dec. 28, 2006, now Pat. No. 7,918,648.

(51) Int. Cl.
*F03D 3/06* (2006.01)
*H02K 35/00* (2006.01)

(52) U.S. Cl. .............................. 290/55; 290/44; 416/111

(58) Field of Classification Search .................... 290/43, 290/44, 54, 55; 416/111, 119
See application file for complete search history.

(56) References Cited

U.S. PATENT DOCUMENTS

| | | | | | |
|---|---|---|---|---|---|
| 3,992,132 | A | * | 11/1976 | Putt ............................... | 417/271 |
| 4,134,710 | A | * | 1/1979 | Atherton ....................... | 416/117 |
| 4,408,955 | A | * | 10/1983 | Wagle et al. .................. | 416/119 |
| 5,844,323 | A | * | 12/1998 | Hung .............................. | 290/54 |
| 6,688,842 | B2 | * | 2/2004 | Boatner ........................ | 415/4.2 |
| 6,798,090 | B2 | * | 9/2004 | Cheung et al. ................. | 310/17 |
| 6,812,583 | B2 | * | 11/2004 | Cheung et al. ................ | 290/1 R |
| 6,926,491 | B2 | * | 8/2005 | Migler ........................... | 415/4.4 |
| 7,245,042 | B1 | * | 7/2007 | Simnacher ..................... | 290/55 |
| 7,918,648 | B1 | * | 4/2011 | Simnacher .................... | 416/111 |

* cited by examiner

*Primary Examiner* — Nicholas Ponomarenko
(74) *Attorney, Agent, or Firm* — Egbert Law Offices PLLC

(57) ABSTRACT

An electrical energy apparatus has a shaft, a first arm extending radially outwardly from the shaft, a second arm extending radially outwardly from the shaft in spaced relationship to the first arm, a third arm extending radially outwardly from the shaft in spaced relationship to the first and second arms, a first set of vanes extending outwardly of the first arm, a second set of vanes extending outwardly of the second arm, a third set of vanes extending outwardly of the third arm, and a generator cooperative with the shaft for producing electrical energy relative to a rotation of the shaft. A magnetic inductor is connected to a vane so as to coordinate movement of the vanes during rotation.

19 Claims, 3 Drawing Sheets

WINDPOWER GENERATOR APPARATUS WITH AUXILIARY GENERATORS

CROSS-REFERENCE TO RELATED U.S. APPLICATIONS

The present application is a continuation-in-part of U.S. application Ser. No. 11/617,581, filed on Dec. 28, 2006, entitled "Windpower Generator Apparatus," currently pending.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to apparatus and systems for the generation of electricity by the action of wind. More particularly, the present invention relates to windpower generators in which of the arms of the windpower generator have vanes thereon which pivot by action of gravity and wind. Additionally, the present invention relates to windpower generators that have magnetic inductors on the vanes thereof for generating electricity.

2. Description of Related Art Including Information Disclosed Under 37 CFR 1.97 and 37 CFR 1.98

Wind energy generation is becoming increasingly popular as a means for producing energy. The production of energy from the motion of wind is a safe, clean and efficient power source. As the blades of the wind power generator rotate, they correspondingly rotate the shaft of a turbine so as to produce energy. This energy can be delivered for personal or commercial use. Large wind energy farms are now being built wherein a great deal of wind energy can be obtained in relatively windy areas of the country.

One of the major problems associated with wind energy generators is the action of the drag of the wind on the action of the blade. For example, when one of the blades of a wind energy generator captures the wind, another of the blades actually creates drag which inhibits the free rotation of the blades. As such, it is extremely desirable to minimize the drag on the blade during the rotation of the blades by action of the wind.

In the past, wind energy generators have not utilized the action of gravity so as to effect the minimization of drag on the blades. Since virtually all wind energy generators have the blades mounted to a horizontal shaft and which all of the blades face the wind, it is virtually impossible to minimize the action of drag without a rotation of the blades during the rotation of the shaft. In other words, when the full face of the blade faces the wind, drag will be inherent. However, if it were possible to rotate the blades so that the thin edge of one of the blades faces the wind while another of the blades captures the wind, then drag can be minimized. Unfortunately, such systems for the simultaneously rotation of the individual blades during the rotation of the shaft are exceedingly complex and expensive. As such, it would be desirable to minimize the drag-producing profile of the individual blades during the rotation of the shaft so as to, accordingly, minimize drag.

It is also desirable to maximize the amount of energy that a wind energy generator creates. When there is no wind, wind energy generators do not create energy because there is no wind to rotate the blades of the wind energy generators. When a wind energy generator does rotate, inefficiencies, such as the drag forces discussed above, hinder the ability for the wind energy generator to create energy. Thus, there is a need for a wind energy generator to better counter-balance the inefficiencies that are inherent in such systems.

In the past, various patents have issued relating to shuttered wind energy generators and magnetic inductors. U.S. Pat. No. 5,126,584 describes a wind energy generator that is configured so as to rotate about a vertical shaft. Each vane of the wind energy generator is formed of an outer stationary shutter and a movable inner shutter. The movable inner shutter is capable of pivoting about it longitudinal axis. A control mechanism is provided so as to adjust angular orientation of the movable shaft.

U.S. Pat. No. 4,551,631 teaches a wind energy generating plant that is positioned on a vertical axis. A plurality of shutter assemblies are disposed in a circular orientation around each turbine assembly and are independently operable for causing wind current to be directed thereby for rotating the turbine assemblies. Five wall elements extend outwardly tangential to the periphery defined by the shutter assemblies and intercept the wind current and direct the wind currents toward the shutter assemblies. A control system for the manipulation of shutters relative to the wind conditions is also described.

U.S. Pat. No. 591,775, issued on Oct. 12, 1987, is an early patent describing the use of shutter assemblies for a windmill. The shutter assemblies are arranged about a vertical axis rotation. A mechanism is provided to control the orientation of the blades such that as the windmill rotates, the flat sides of the shutters will be presented to receive the full force of the wind. As they move rearwardly and forwardly, the shutters will gradually turn to present their edges to the wind so as to avoid any reduction in the rotation speed of the windmill. As the blades pass across the rear portions of the windmill into the direction of the wind, the blades will be turned at different angles so as to receive the wind and assist in the rotation of the windmill.

U.S. Pat. Nos. 4,486,143 and 6,942,454 each describe deflector panels which serve to control the volume of air which bypasses each panel so as to avoid turbulence adjacent the driving vanes of the turbine.

U.S. Pat. No. 5,315,159, issued on May 24, 1994 to Gribnau, discloses a wind turbine for generating electrical energy by use of wind energy. The turbine has a turbine rotor which can be mounted on a mast and is rotatable about a rotor shaft with one or more rotor blades. A generator is equipped with rotor and stator. The generator is a sector machine of the asynchronous type, the stator of which has one or more discrete stator sectors, and the rotor of which is in a continuous, uninterrupted annular form. The rotor is directly coupled to the turbine rotor. The discrete stator sectors extend only opposite of the annular generator rotor. Each discrete stator sector has two stator halves which are fixed on the legs of a U-shaped holder mounted on the mast. Each stator half contains a plate stack with slits for the coil windings. Each individual plate has a single plate which is a circular segment shape. The annular generator rotor passes continuously into the air gap between the two stator halves of each discrete stator sector.

U.S. Pat. No. 7,229,188 issued on Jun. 12, 2007 to Mah, discloses a light generating flashlight system device that utilizes a large centrally located magnet which is mounted to slide past a magnet pickup or current induction wire which may be preferably mounted at a center point of travel in a tubular housing. The tubular housing has a tubular chamber through which the magnet travels. A pair of elastomeric dampers are located at each end of a support system sleeve. The support system sleeve is sized to fit within a main housing so as to stabilize the internal support within a sealed unit.

U.S. Pat. No. 6,984,110, issued on Jan. 10, 2006 to Keun-Suk Jang, discloses a wind power generating apparatus in which windmill blades are mounted in a multi-stage fashion to a rotating shaft while being spaced apart from one another to efficiently generate wind power. Each windmill blade includes blade bodies mounted to the rotating shaft, wind pressure adjusting holes formed in the blade bodies, and wind pressure adjusting plates coupled to each blade body and connected together to a wire. Each wind pressure adjusting plate is slidable along guides respectively arranged at opposite sides of the associated wind pressure adjusting hole so as to adjust an opening degree of the wind pressure adjusting hole. Elastic members are adapted to connect one end of the associated wire to the associated blade body. Winches are adapted to connect the other end of the associated blade body. The winches are mounted to a single shaft to simultaneously wind or unwind all wire.

U.S. Pat. No. 6,960,062, issued on Nov. 1, 2005 to Blank et al., discloses a frost-resistant windmill that provides a supplemental power supply for use preferably in large cities. The frame of the windmill carries hollow blades. The interior of the blades defines a serpentine internal air pathway adapted for introduction of warm air from an external source to prevent freezing when used during winter months. A centrifugal speed adjustment system is provided to reduce rotation speed fluctuations of the load drive shaft when strong wind gusts are encountered. A speed adjustment weight is connected to the drive wheel through a cable such that the position of the drive wheel along the radius of the windmill is defined by an equilibrium between the pull force on the cable and the compression force of the spring urging the drive wheel towards the periphery the windmill.

U.S. Pat. No. 6,857,846, issued on Feb. 22, 2005 to Miller, discloses a stackable, vertical axis windmill that has a braced external frame that enables stacking of multiple windmill assemblies. Couplings are located on both ends of the vertical rotor shaft to enable stacking and the transmission of power. The windmill has an internal wind flow cavity and controlled wind guides. The external frame includes structural bracing that allows for two or more windmills to be stacked one upon another to optimize the use of land or rooftop space for the generation of electricity from wind power. The computer-controlled wind guides automatically close partially in high-wind conditions in order to prevent damage to the windmill. The internal wind flow cavity allows wind to transfer power to both the windward and leeward rotors blades. The rotor axis is constructed so that all bearings can be replaced without dismantling the structure.

U.S. Pat. No. 6,179,563, issued on Jan. 30, 2001 to Minchey, discloses a wind-powered drive shaft, the rotary force of which can be used for a variety of purposes, such as to drive a hydraulic pump, the crankshaft for a water pump, or an electrical generator. A central shaft is attached to two or more sets of arms extending radially outward from the central shaft. Preferably the sets of arms are arranged in pairs about the central shaft. Each set of arms has two or more arms. Two or more pivot shafts are rotatably attached to each arm in a set of arms. A vane composed of light but strong material is connected to each pivot shaft. Attached to one of every two vertically adjacent arms is a stop. The stop is in such a location that the free end of the vane will contact the stop when the free end makes its closest approach to the central shaft.

U.S. Pat. No. 5,525,037, issued on Jun. 11, 1996 to Cummings, discloses a wind turbine for converting wind energy to useable energy. The turbine has overlapping sail members. The sail members extend radially outward from a vertically disposed shaft in three columns positioned equidistantly around the shaft. The overlapping sail members hang downwardly in a naturally biased, vertical orientation so as to block rotational movement of each other in one direction. This configuration allows the wind to engage with the sail members on one side of the shaft to rotate the shaft. Wind also blows past the sail members on the other side of the shaft. Rotation of the cylinder is thus achieved while wind resistance is greatly minimized, regardless of the wind direction. A generator can be rotatably inter-coupled with the cylinder to thereby convert the kinetic energy of rotation to useable energy. Each sail member is preferably positioned such that a gap resides between the sail member and the shaft, where the gap is at least as wide as the sail member.

U.S. Pat. No. 4,545,729, issued on Oct. 8, 1985 to Storm, discloses a wind turbine apparatus that has sail elements secured to a circular frame rotatable in response to wind reacting with the sail elements. A control system for the sail elements includes a weight having cables extending from the weight to the sail elements. Movement of the weight in response to wind velocity results in a change in the sail elements exposed to the wind.

U.S. Pat. No. 4,534,703, issued on Aug. 13, 1985 to Flavell, discloses a wind power system that has a vertically orientated main shaft. The wind power system further includes first and second horizontally-oriented main frames. The first horizontally-oriented main frame has vanes defining a first set of vanes and an equal number of vanes defining a second set of vanes located diametrically opposite each other about the main shaft. Similarly, the second horizontally-oriented main frame includes a third set and a fourth set of vanes. Preferably, the vanes are flat and rectangular in shape and are pivotable about one of the vertical edges thereof by a shaft that is pivotally mounted to the main frame between a first, wind catching position and a second, wind releasing position. The vanes of the vane sets are maintained in the same relative position to each other.

U.S. Pat. No. 4,191,507, issued on Mar. 4, 1980 to DeBerg, discloses a vertical centrally located frame that has three vertical windmill-vane arrays extending radially outward therefrom. The vane arrays are spaced circumferentially 120 degrees from each other about the rotatable framework. Each vane array includes flat flexible sails rigged one under the other between leading and trailing horizontal arms in the array with an upper leading edge of each sail being directly fastened to a different one of the leading arms. A lower edge of each sail is fastened by flexible cords to a different one of the trailing arms so that when the wind blows in the direction of the leading arm, the sail billows outwardly to turn the framework. When the wind blows in the opposite direction the sails are lifted flat so as to provide low drag. In one embodiment, the arms are cables that are stretched radially from the central vertical framework by other cables so that the entire structure is easily disassembled for shipment.

U.S. Patent Publication No. 2005/0141994, published on Jun. 30, 2005 to Jang-sik Joo, discloses a multi-directional wind power generator that has a base frame having a central shaft supported on the ground. The base is disposed around the central shaft so as to define a space of a predetermined radius. A first rotary shaft is rotatably fitted around the central shaft of the base frame. A first upper/lower support frames extend from upper and lower outer peripheries of the first rotary shaft to a predetermined radius. First rotary blades are hinged by their both ends, respectively, on distal ends of the first upper/lower support frames. First anti-pivoting bars are disposed, respectively, at portions of the first upper/lower frames to prevent pivoting of the first rotary blades so that the first rotary blades are oriented parallel with the first upper/lower support frames. A first controller is disposed respectively in the first upper/lower support frames for controlling pivoting of the first rotary blades. A rotation power transmitter is disposed around a lower portion of the central shaft of the base frame for transmitting the rotation power of the first rotary shaft at a rotation rate changed via a gear combination. A generator generates electric power under the rotation power transmitted from the rotation power transmitter.

It is an object of the present invention to provide a windpower generator which produces electrical energy by the action of wind.

It is another object of the present invention to provide a windpower generator which produces electrical energy by magnetic induction.

It is another object of the present invention to provide a windpower generator which minimizes the drag affecting the rotation of the blades.

It is a still another object of the present invention to provide a wind energy generator in which the orientation of the vanes of the wind energy generator are controlled by the action of wind and gravity.

It is a another object of the present invention to provide a wind energy generator which is reliable, cost-effective and energy efficient.

These and other objects and advantages of the present invention will become apparent from a reading of the attached specification and appended claims.

BRIEF SUMMARY OF THE INVENTION

The present invention is an electrical energy apparatus comprising a shaft, a first arm that extends radially outwardly from the shaft, a second arm that extends radially outwardly from the shaft in spaced relationship to the first arm, a third arm that extends radially outwardly from the shaft in spaced relationship to the first and second arms, a first plurality of vanes that extends outwardly of the first arm, a second plurality of vanes that extends outwardly of the second arm, a third plurality of vanes that extends outwardly of the third arm, a generating means cooperative with the shaft for producing electrical energy relative to a rotation of the shaft, and a first magnetic induction means connected to a vane of the first plurality of vanes for producing electrical energy relative to a movement of the first plurality of vanes between the first and second positions.

Each of the first plurality of vanes is movable between a first position aligned with the first arm and a second position extends generally transverse to the first arm. Each of the second plurality of vanes is movable between a first position aligned with the second arm and a second position extends transverse to the second arm. Each of the third plurality of vanes is movable between a first position aligned with the third arm and a second position extends generally transverse to the third arm.

A second magnetic induction means is connected to a vane of the second plurality of vanes for producing electrical energy relative to a movement of the second plurality of vanes between the first and second positions. A third magnetic induction means is connected to a vane of the third plurality of vanes for producing electrical energy relative to a movement of the third plurality of vanes between the first and second positions.

Each of the first magnetic induction means and the second magnetic induction means and the third magnetic induction means comprises a housing having a first end and a second end, a magnet placed in the housing, and a wire coil placed adjacent the housing. The magnet is suitable for oscillating between the first and second ends of the housing. The wire coil is placed so that the magnet oscillates past the wire coil. A carriage is placed inside the housing. The wire coil is placed adjacent an outer surface of the carriage. The magnet is placed in an interior of the carriage. The carriage is removable from the housing. A protecting means is placed adjacent the first and second ends of the housing for reducing a force of contact of the magnet.

A first pulley is attached to an innermost vane of the first plurality of vanes. A second pulley attached to an innermost vane of the second plurality of vanes. A third pulley is attached to an innermost vane of the third plurality of vanes. A tensioning means is placed around the first and the second and the third pulleys for tensioning the innermost vanes of the first and the second and the third plurality of vanes.

Each of the first plurality of vanes and the second plurality of vanes and the third plurality of vanes is movable between the first and second positions by action of gravity. The first plurality of vanes is in the first position when the plurality of vanes of one of the second plurality of vanes and the third plurality of vanes is in the second position. The tensioning means is suitable for utilizing a gravity force of the one of the second plurality of vanes and the third plurality of vanes so as to tension the first plurality of vanes in the first position when the one of the second plurality of vanes and the third plurality of vanes is in the second position. The first plurality of vanes is in the first position when in a position above the shaft. One of the second and third pluralities of vanes is in the second position when in a position below the shaft.

Each of the first arm and the second arm and the third arm comprises a first rod affixed to the shaft, and a second rod affixed to the shaft. The first rod extends outwardly from the shaft. The second rod extends outwardly from the shaft in spaced parallel relationship to the first rod. The plurality of vanes is pivotally affixed to the first and second rods. The shaft has a hub affixed thereover. The first arm and the second arm and the third arm are affixed to the hub. Each of the vanes of the first plurality of vanes and the second plurality of vanes and the third plurality of vanes overlies an edge of an adjacent vane when in the first position.

BRIEF DESCRIPTION OF THE SEVERAL
VIEWS OF THE DRAWINGS

DETAILED DESCRIPTION OF THE INVENTION

Figure 1:
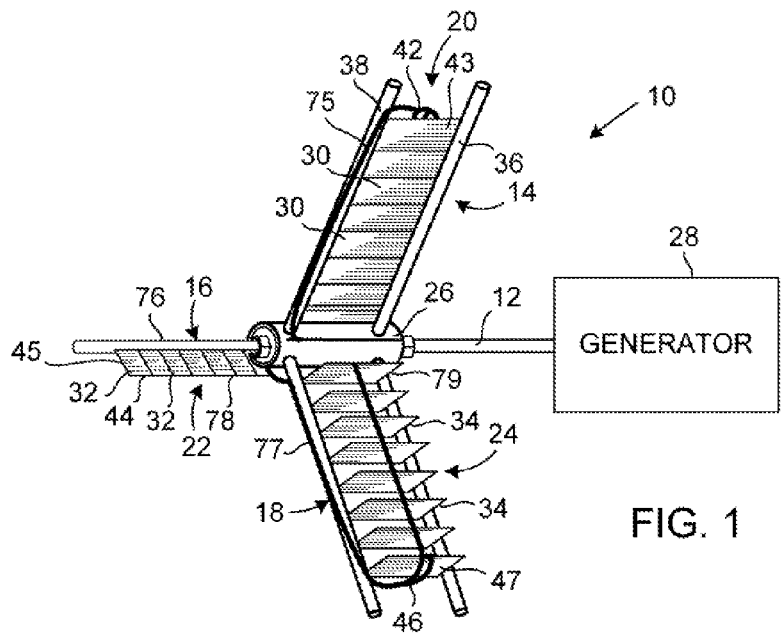
FIG. 1 is a perspective view of the windpower generator apparatus of the present invention.

Referring to FIG. 1, there is shown the windpower generator apparatus 10 in accordance with the preferred embodiment of the present invention. The windpower generator apparatus 10 includes a shaft 12, a first arm 14 extending outwardly of the shaft 12, a second arm 16 extending outwardly of the shaft in spaced radial relationship to the first arm 14, and a third arm 18 extending outwardly of the shaft 12 in spaced radial relationship to the first arm 14 and the second arm 16. A plurality of vanes 20 are pivotally affixed to the first arm 14. A second plurality of vanes 22 are pivotally attached to the second arm 16. A third plurality of vanes 24 are pivotally affixed to the third arm 18. The arms 14, 16 and 18 are directed affixed to the hub 26 which is, in turn, affixed over the horizontal shaft 12. The shaft 12 is operatively connected to a generator 28. As such, as the arms 14, 16 and 18 rotate, the hub 26 will correspondingly rotate the shaft 12 which produces electrical energy from the turbine-like action of the generator 28.

Importantly, as can be seen in FIG. 1, the first plurality of vanes 20 is in a position generally aligned with the first arm 14. As such, they establish a generally planar relationship with the first arm 14. In this position, the first plurality of vanes 20 is particularly configured so as to fully receive the force of the wind imparted thereto. Each of the individual vanes 30 are separately pivotally affixed to the arm 14. Since the first arm 14 is in a position above the shaft 12 in a generally upward orientation, the force of gravity and wind will cause the individual vanes of the first plurality of vanes 20 to drop downwardly so as to overlie each other and to present a full surface for the receipt of wind thereagainst. When the shift is oriented vertically, the force of the wind will automatically cause the movement of the vanes.

The second plurality of vanes 22 shows the separate vanes 32 thereof as extending somewhat transverse to the longitudinal axis of the arm 16. Since the individual vanes 32 of the second plurality of vanes 22 are rearwardly of the first arm 14 and the second arm 18, the vanes 32 will not receive wind blowing in the direction of the first arm 14. Action of wind is generally blocked from acting on the vanes 32 by the hub 26 and by the vanes associated with the arms 14 and 18. The action of gravity and wind will cause the individual vanes 32 to pivot generally downwardly during the rotation of the shaft 12.

The individual vanes 34 of the third plurality of vanes 24 are pivotally attached to arm 18. As can be seen, in this second position, the individual vanes 34 define a space with respect to an adjacent vane 34. The vanes 34 pivot into this second position by the action of gravity. Since the vanes 34 are located below the shaft 12, they will rotate so as to open to the wind. As a result, the wind will blow rather freely between each of the vanes 34 so as to minimize the drag affecting the rotation of the shaft 12 of the windpower generator apparatus 10.

In FIG. 1, it can be seen that the first arm 14 includes a first rod 36 and a second rod 38. The first rod 36 is affixed to the hub 26. The second rod 38 is affixed to the hub 26 in spaced parallel relationship to the first rod 36. The individual vanes 30 are pivotally affixed along one edge to each of the rods 36 and 38. In the preferred embodiment of the present invention, a pair of rods 36 and 38 are utilized. However, within the concept of the present invention, it is possible that only a single rod could be utilized in association with the vanes 30. Additionally, it is possible that a single rod could be positioned generally centrally of each of the first plurality of vanes 20 so as to cause the requisite pivotal action in accordance with the present invention. The second arm 16 and third arm 18 also have a pair of parallel-spaced rods which support the respective 32 and 34.

The wind power generator apparatus 10 has a first induction means 42 connected to a vane 43 of the first plurality of vanes 20, a second induction means 44 connected to a vane 45 of the second plurality of vanes 22, and a third magnetic induction means 46 connected to a vane 37 of the third plurality of vanes 24. Each of the magnetic induction means 42, 44, and 46 produces electrical energy relative to a movement of the first plurality of vanes 20, second plurality of vanes 22, and third plurality of vanes 24, respectively, between the first and second positions. A wire 75 connects the first induction means 42 to the hub 26 so as to transfer electrical energy from the first induction means 42 to the hub 26. A wire 76 connects the second induction means 4 to the hub 26 so as to transfer electrical energy from the second induction means 44 to the hub 26. A wire 77 connects the third induction means 46 to the hub 26 so as to transfer electrical energy from the third induction means 46 to the hub 26. In the present invention, the vanes 30 of the first plurality of vanes 20 are connected together by a line. Likewise, the vanes 32 of the second plurality of vanes 22 are connected together by a line 78. The vanes 34 of the third plurality of vanes 24 are connected together by line 79. The lines 78 and 79 ensure that the vanes 30, 32, and 34 all open and close at the same time. That is, a movement of one of the vanes 30 of said first plurality of vanes 20 causes a concomitant movement of the other of the vanes 30 of the first plurality of vanes 20. Likewise, a movement of one of the vanes 32 of said second plurality of vanes 22 causes a concomitant movement of the other of the vanes 32 of the second plurality of vanes 22. A movement of one of the vanes 34 of said third plurality of vanes 24 causes a concomitant movement of the other of the vanes 34 of the third plurality of vanes 24.

In FIG. 1, vanes 43, 45 and 47 are the outermost vanes. Thus, the magnetic induction means 42, 44, and 46 are connected to the outermost vanes 43, 45 and 47, respectively. The first magnetic induction means 42 is connected to the first plurality of vanes 20, which is in the first position. The second magnetic induction means 44 is connected to the second plurality of vanes 22, which is between the first and second positions. The third magnetic induction means 46 is attached to the third plurality of vanes 24, which is in the second position. Although the induction means 42, 44, and 46 are shown as connected to outermost vanes 43, 45, and 47, respectively, the induction means 42, 44, and 46 can be connected to any of the vanes 30, 32, and 34, respectively.

The wind energy generator apparatus 10 generates electricity as the arms 14, 16, and 18 rotate the shaft 12 and generator 28. Additionally, the induction means 42, 44 and 46 generate electricity as the arms 14, 16 and 18 rotate around the shaft 12 and as the vanes 20, 22 and 24 move between the first and second positions. The wind energy generator apparatus 10 thus has an additional method for creating electricity by the addition of the magnetic induction means 42, 44 and 46. The magnetic induction means 42, 44 and 46 make the wind energy generator apparatus 10 more efficient in generating electricity without greatly affecting the drag and inefficiency of the apparatus 10. The weight of the induction means 42, 44, and 46 adds weight to the apparatus 10 so as to increase torque.

Figure 2:
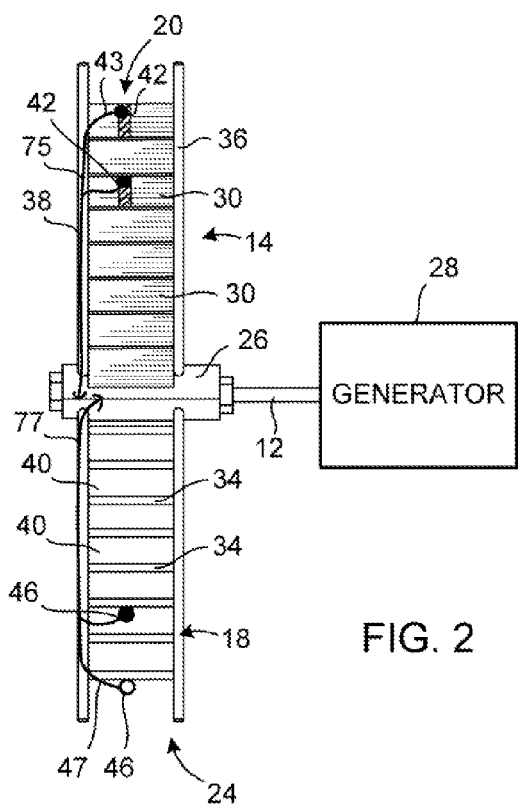
FIG. 2 is a frontal view as viewed from the direction of wind approaching the wind energy generator of the present invention.

As can be seen in FIG. 2, the vanes 30 of the first plurality of vanes 20 are in their first position, which is pivoted downwardly so as to present a closed surface to oncoming wind. The vanes 30 of the first plurality of vanes 20 pivot to this first position by action of wind and gravity. Correspondingly, the vanes 34 of the third plurality of vanes 24 are pivoted to a second position in which each of the vanes 34 opens generally parallel to each other so as to define a space 40 between adjacent vanes. This movement to the second position is accomplished also by the action of gravity. The first induction means 42 has two inductors connected to the vanes 30 of the first plurality of vanes 20. Likewise, the third induction means 46 has two inductors connected to the vanes 34 of the third plurality of vanes 24. Although not shown in FIG. 2, the second plurality of vanes also has multiple inductors thereon. Thus, it is possible to have multiple inductors Through the configuration illustrated in FIG. 2, oncoming wind fully affects the vanes 30 when they are in their first position. The first plurality of vanes 20 are configured so that each of the individual vanes 30 overlie the edge of an adjacent vane so as to present a closed surface. As such, the first plurality of vanes 20 will receive the full force of the wind thereagainst. At the same time, the third plurality of vanes 24 defines an open space 40 between the adjacent vanes 34 so as to virtually eliminate drag effects by allowing the wind to blow freely therethrough. Since the second plurality of vanes 22 on the second arm 16 are obscured by the hub 26 and the first plurality of vanes 20, there would be only minimal drag effects affecting the second arm 16. As a result, the present invention is able to optimize the power produced from oncoming wind by minimizing the drag effects.

The first induction means 42 can be seen as connected to the outermost vane 43 of the first plurality of vanes 20. The third induction means 46 can be seen as attached to the outermost vane 47 of the third plurality of vanes 24. The vanes 30 of the first plurality of vanes 20 can be seen in the first position. When the vanes 30 of the first plurality of vanes 20 are in the first position, the first magnetic induction means 42 is parallel to arms 14. The vanes 40 of the third plurality of vanes 24 can be seen in the second position. When the vanes 40 of the third plurality of vanes 24 are in the second position, the third magnetic induction means 46 is transverse to arms 18.

Figure 3:
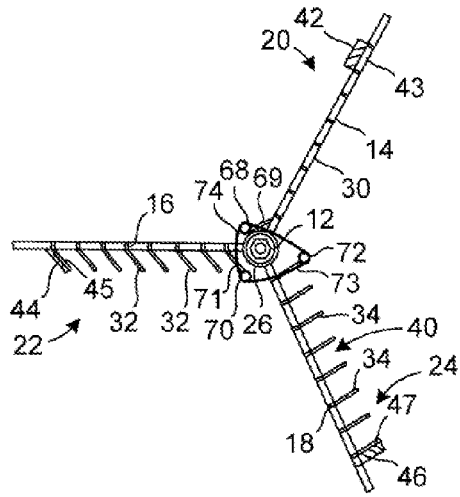
FIG. 3 is an end view of the wind energy generator of the present invention.

FIG. 3 shows an end elevational view of the windpower generator apparatus 10 of the present invention, with the generator 28 is omitted. The first arm 14 is in a position above the shaft 12. The third arm 18 is in a position below the shaft 12. The individual vanes 30 on arm 14 are in a position generally aligned with the arm 14. The second arm 16 is located rearwardly of the hub 26 on shaft 12. The individual vanes 32 are pivotally connected to arm 16 so as to pivot downwardly by the action of gravity and wind. As the shaft 12 rotates, the third arm 18 has its individual vanes 34 fully opened so as to extend transverse the arm 18 and define the space 40 between the adjacent vanes 34. This pattern of opening and closing of the individual vanes continues throughout the rotation of the shaft 12. As such, the present invention is able to optimize the receipt of wind energy and, as such, optimize the production of electrical energy from the generator. Drag is very much minimized through the configuration of the windpower generator apparatus of the present invention. Since the vanes open and close by the action of wind and gravity, no power is consumed by the vanes during movement. Also, within the concept of the present invention, it is possible to extend the shaft vertically such that the movement of the vanes occurs only by the action of wind.

In FIG. 3, the third plurality of vanes 24 is in the second position while the first plurality of vanes 20 is in the first position. Thus, the first magnetic induction means 42 is parallel to arm 14, the second magnetic induction means 44 is in a position between parallel and transverse with respect to arm 16, and the third magnetic induction means 46 is transverse to arm 18.

FIG. 3 shows a first pulley 68 attached to an innermost vane 69 of the first plurality of vanes 20. A second pulley 70 is attached to an innermost vane 71 of the second plurality of vanes 22. A third pulley 72 is attached to an innermost vane 73 of the third plurality of vanes 24. A tensioning means 74 is placed around the pulleys 68, 70, 72 for tensioning said innermost vanes 69, 71, 73 of the pluralities of vanes 20, 22, 24, respectively. In FIG. 3, the tensioning means is a chain, but the present invention contemplates that the tensioning means 74 can be any other continuous-loop material (e.g., a belt, a chain, a line, a wire, etc.) suitable for holding tension against the pulleys 68, 70, 72 so as to tension the vanes 69, 71, 73. The third plurality of vanes 24 is in the second position and adds a downward gravity force to the tensioning means 74. This occurs because, when the vanes 24 are in the second position, the third pulley 72 is located further away from the shaft 12 and exerts a radial outward force on the tensioning means 74. The tensioning means 74 exerts this force on the first pulley 68. Because the first pulley 68 is attached to innermost vane 68, the first plurality of vanes 20 is tensioned in the first position and will not open so as to allow wind to pass between the vanes 30. The second plurality of vanes 22 is in a position between the first and second position and also adds a downwardly gravity force to the tensioning means 74. Thus, the pulleys 72 and 70 pull downwardly on the tensioning means 74 so as to tension the first pulley 68 and hold the first plurality of vanes 20 in the first position as the pulleys 70 and 72 pass beneath the shaft 12. The added tension on the first plurality of vanes 20 helps prevent the first plurality of vanes 20 from opening and allowing wind to pass between the vanes 30. Thus, the tensioning means 74 helps to increase the efficiency of the windpower energy generator apparatus 10 of the present invention. As the wind energy generator apparatus 10 rotates in response to wind forces, any two pluralities of vanes can exert a downward force on the tensioning means 74 so as to keep the vanes of the remaining plurality of vanes in the first position.

Figure 4:
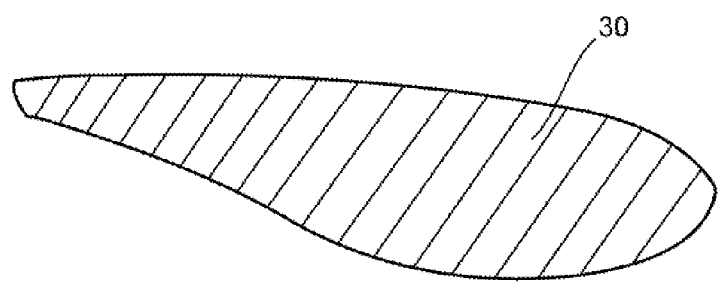
FIG. 4 is a cross-sectional view of an individual vane of the wind energy generator of the present invention.

To further optimize the impact of wind energy, each of the individual vanes has a generally airfoil shape. FIG. 4 shows an individual vane 30. The individual vane 30 has its airfoil shape so as to maximize lift and minimize drag of the wind across an individual vane.

Figure 5:
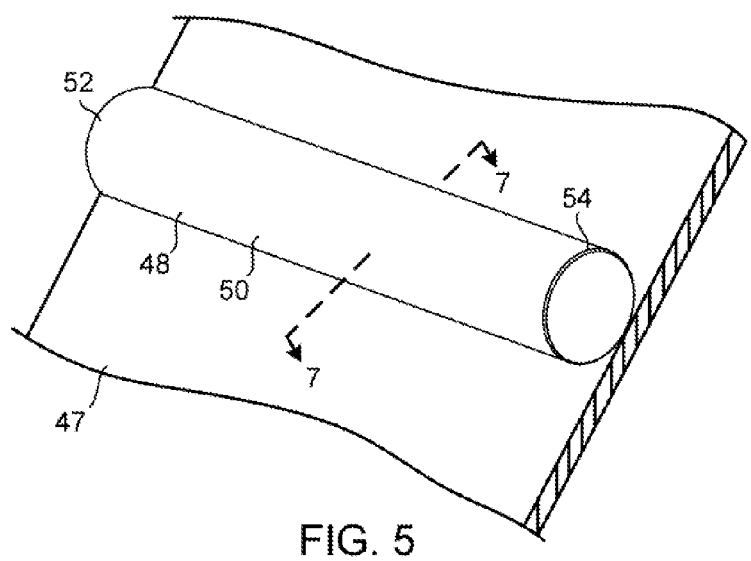
FIG. 5 shows an isolated perspective view of a magnetic induction means mounted on a vane.

Referring to FIG. 5, there is shown an isolated perspective view of the preferred embodiment of the magnetic induction means 48 according to the teachings of the present invention connected to the vane 47. The magnetic induction means 48 has a housing 50. The housing 50 is shown as tubular in shape, but the magnetic induction means 48 can have a housing of any shape appropriate for performing magnetic induction therein. The housing 50 has a first end 52 and a second end 54. The housing 50 can be connected to a load (not shown) so as to transmit electrical energy generated by the induction means 48. In the preferred embodiment, the housing 50 is generally the same length as the width of the vane 47. The magnetic induction means 48 typically includes wire coils and a magnetic that passes by the wire coils. The magnetic generally passes by the wire coils so that the magnetic field of the magnet passes perpendicularly relative to the wire coils, i.e. conductor, so as to generate electrical current in the wire coils. The wire coils and magnets can be placed in the interior of the housing 50 so that the magnet suitably oscillates past the wire coils so that the magnetic field of the magnetic passes perpendicularly past the wire coils. Many different configurations of the magnetic induction means 48 are possible. The discussion and description is only an example of the preferred embodiment of the magnetic induction means 48.

Figure 6:
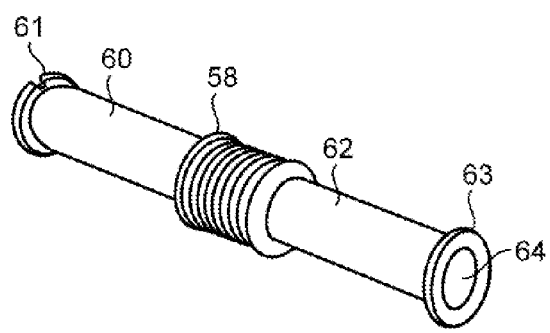
FIG. 6 shows an isolated perspective view of the carriage of the magnetic induction means.

Referring to FIG. 6, there is shown an isolated perspective view of the preferred embodiment of the carriage 60 of the magnetic induction means 48. The carriage 60 is placed inside the housing 50. A wire coil is placed on an exterior surface 62 of the carriage 60. In FIG. 6, there is one wire coil 58 placed on the carriage 60. However, multiple wire coils can be placed on the carriage 60 so as to increase the production of electrical energy for any single magnetic induction means. The magnet (not shown) of the magnetic induction means 48 can be placed on an interior 64 of the carriage 60. The magnet slides past the wire coil 58 as it oscillates between the first end 61 and second end 63 of the carriage 60. When the wire coil 58 is placed on the carriage 60, it is adjacent the housing 50. The present invention contemplates that the magnetic induction means 48 has no carriage and simply has a wire coil 58 adjacent the housing 50 with a magnet oscillating between the ends 52 and 54 of the housing 50. Having a removable carriage 60 allows the removal and repair of the magnet and wire coil 58 without having to remove the housing 50 of the magnetic induction means 48 from the vane 47.

Figure 7:
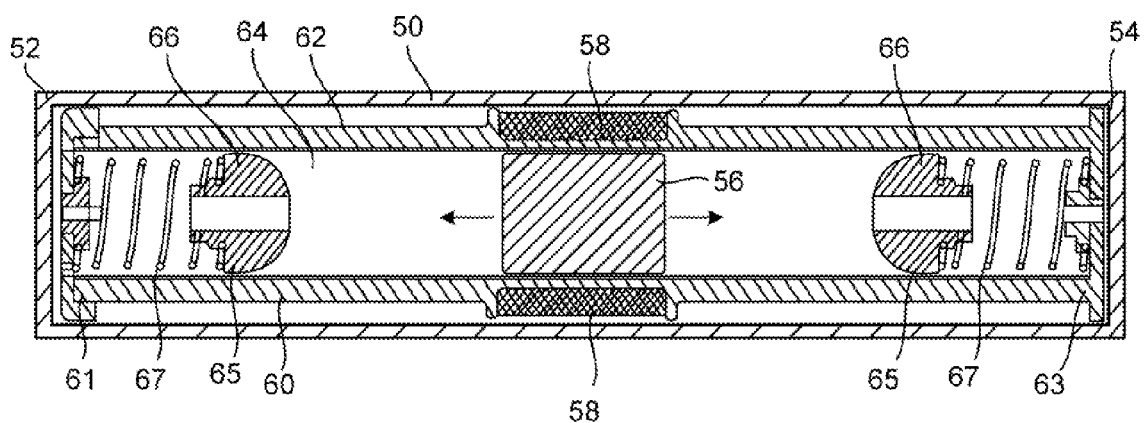
FIG. 7 shows a cross-sectional view of the magnetic induction means of the present invention, taken along sight line 7-7 in FIG. 5.

Referring to FIG. 7, there is shown a cross-sectional view of the magnetic induction means 48 of the present invention, taken along sight line 7-7 in FIG. 5. The magnetic induction means 48 can be seen as having a housing 50, a magnet 56 placed in the housing 50, and a wire coil 58 placed adjacent the housing 50 such that the magnet 56 oscillates past the wire coil 58. In the preferred embodiment, the housing 50 is tubular in shape. Thus, the carriage 60 is also tubular in shape. The wire coil 58 is wrapped around the exterior surface 62 of the carriage 60. As discussed above, the present invention contemplates that the magnetic induction means 48 can have more than one wire coil 58 placed thereon. In the housing 50 and in the interior 64 of the carriage 60, the magnet 56 is suitably sized for oscillating between the first and second ends 52 and 54 of the housing and the first and second ends 61 and 63 of the carriage. The magnetic induction means 48 can have a protecting means 66 placed adjacent the first and second ends 52 and 54 of the housing. The protecting means 66 reduces a force of contact of the magnet 56 as the magnet 56 oscillates between ends 52 and 54 of the housing. The protecting means 66 thus protects the integrity of the end 52, 54, 61, and 63 of the magnetic induction means 48 and prolongs the useful life of the magnetic induction means 48. In FIG. 7, the protective means are connected to the ends 61 and 63 of the carriage 60. The protecting means 66 can also be connected to the ends 52 and 54 of the housing 50. Each of the protecting means 66 has a bumper 65 and a spring 67. The protecting means 66 can have any configuration and does not necessarily have to have a bumper 65 or a spring 67. The protecting means 66 can be of any configuration for reducing a force of the magnetic 56. The protecting means 66 can be only a bumper 65 or only a spring 67. The bumper 66 can be a damper. The bumper 66 can be made of a polymeric, elastic, elastomer, or elastomeric material.

The foregoing disclosure and description of the invention is illustrative and explanatory thereof. Various changes in the details of the illustrated construction can be made within the scope of the present claims without departing from the true spirit of the invention. The present invention should only be limited by the following claims and their legal equivalents.

I claim:

1. A windpower generator apparatus comprising:
    a shaft;
    a first arm extending radially outwardly from said shaft;
    a second arm extending radially outwardly from said shaft in spaced relationship to said first arm;
    a third arm extending radially outwardly from said shaft in spaced relationship to said first and second arms;
    a first plurality of vanes extending outwardly of said first arm, each of said first plurality of vanes being movable between a first position aligned with said first arm and a second position extending generally transverse to said first arm;
    a second plurality of vanes extending outwardly of said second arm, each of said second plurality of vanes movable between a first position aligned with said second arm and a second position extending transverse to said second arm;
    a third plurality of vanes extending outwardly of said third arm, each of said third plurality of vanes movable between a first position aligned with said third arm and a second position extending generally transverse to said third arm;
    a generating means cooperative with said shaft for producing electrical energy relative to a rotation of said shaft; and
    a magnetic induction means connected to a vane of at least one of said first, second, and third pluralities of vanes, said magnetic induction means for producing electrical energy relative to a movement of said first plurality of vanes between said first and second positions.

2. The apparatus of claim 1, said magnetic induction means comprising:
    a first magnetic induction means connected to a vane of said first plurality of vanes for producing electrical energy relative to a movement of said first plurality of vanes between said first and second positions;
    a second magnetic induction means connected to a vane of said second plurality of vanes for producing electrical energy relative to a movement of said second plurality of vanes between said first and second positions; and
    a third magnetic induction means being connected to a vane of said third plurality of vanes for producing electrical energy relative to a movement of said third plurality of vanes between said first and second positions.

3. The apparatus of claim 2, each of said first magnetic induction means and said second magnetic induction means and said third magnetic induction means comprising:
    a housing having a first end and a second end;
    a magnet placed in said housing, said magnet suitable for oscillating between said first and second ends of said housing; and
    at least one wire coil placed adjacent said housing such that said magnet oscillates past said wire coil.

4. The apparatus of claim 3, each of said first magnetic induction means and said second magnetic induction means and said third magnetic induction means further comprising:
    a carriage placed inside said housing, the wire coil placed adjacent an exterior surface of said carriage, said magnet placed in an interior of said carriage, said carriage suitable for removal from said housing.

5. The apparatus of claim 4, each of said first magnetic induction means and said second magnetic induction means and said third magnetic induction means further comprising:

a protecting means placed adjacent said first and second ends of said housing for reducing a force of contact of said magnet against said first and second ends.

6. The apparatus of claim 2, further comprising:
a first pulley attached to a vane of said first plurality of vanes;
a second pulley attached to a vane of said second plurality of vanes;
a third pulley attached to a vane of said third plurality of vanes; and
a tensioning means placed around said first and said second and said third pulleys for coordinating a movement of said first and said second and said third plurality of vanes.

7. The apparatus of claim 6, each of said first plurality of vanes and said second plurality of vanes and said third plurality of vanes being movable between said first and second positions by action of gravity.

8. The apparatus of claim 7, said first plurality of vanes being in said first position when said plurality of vanes of one of said second plurality of vanes and said third plurality of vanes is in said second position.

9. The apparatus of claim 6, said first plurality of vanes being connected by a line such that a movement of one of the vanes of said first plurality of vanes causes a concomitant movement of the other of said first plurality of vanes.

10. The apparatus of claim 1, said magnetic induction means comprising:
a plurality of magnetic induction generators attached to at least one of the vanes of each of said first and second and third pluralities of vanes.

11. The apparatus of claim 1, each of said first arm and said second arm and said third arm comprising:
a first rod affixed to said shaft and extending outwardly therefrom; and
a second rod affixed to said shaft and extending outwardly therefrom in spaced parallel relationship to said first rod, the plurality of vanes being pivotally affixed to said first and second rods, said shaft having a hub affixed thereover, said first arm and said second arm and said third arm being affixed to said hub.

12. The apparatus of claim 2, each of said vanes of said first plurality of vanes and said second plurality of vanes and said third plurality of vanes overlying an edge of an adjacent vane when in said first position.

13. A windpower generator apparatus comprising:
a shaft;
a first arm extending radially outwardly from said shaft;
a second arm extending radially outwardly from said shaft in spaced relationship to said first arm;
a third arm extending radially outwardly from said shaft in spaced relationship to said first and second arms;
a first plurality of vanes extending outwardly of said first arm, each of said first plurality of vanes being movable between a first position aligned with said first arm and a second position extending generally transverse to said first arm;
a second plurality of vanes extending outwardly of said second arm, each of said second plurality of vanes movable between a first position aligned with said second arm and a second position extending transverse to said second arm;
a third plurality of vanes extending outwardly of said third arm, each of said third plurality of vanes movable between a first position aligned with said third arm and a second position extending generally transverse to said third arm;
a generating means cooperative with said shaft for producing electrical energy relative to a rotation of said shaft; and
a tensioning means for coordinating a movement of said first and said second and said third plurality of vanes.

14. The apparatus of claim 13, said tensioning means comprising:
a first pulley attached to a vane of said first plurality of vanes;
a second pulley attached to a vane of said second plurality of vanes;
a third pulley attached to a vane of said third plurality of vanes; and
a chain placed around said first and said second and said third pulleys.

15. The apparatus of claim 14, each of said first plurality of vanes and said second plurality of vanes and said third plurality of vanes being movable between said first and second positions by action of gravity.

16. The apparatus of claim 15, said first plurality of vanes being in said first position when said plurality of vanes of one of said second plurality of vanes and said third plurality of vanes is in said second position.

17. The apparatus of claim 14, said first plurality of vanes being connected by a line such that a movement of one of the vanes of said first plurality of vanes causes a concomitant movement of the other of said first plurality of vanes.

18. The apparatus of claim 13, further comprising:
a magnetic induction means connected to a vane of at least one of said first, second, and third pluralities of vanes, said magnetic induction means for producing electrical energy relative to a movement of said first plurality of vanes between said first and second positions.

19. The apparatus of claim 18, said magnetic induction means comprising:
a housing having a first end and a second end;
a magnet placed in said housing, said magnet suitable for oscillating between said first and second ends of said housing; and
at least one wire coil placed adjacent said housing such that said magnet oscillates past said wire coil.

* * * * *